US012036673B2

(12) United States Patent
Hallock et al.

(10) Patent No.: US 12,036,673 B2
(45) Date of Patent: *Jul. 16, 2024

(54) SYSTEMS AND METHODS FOR A PASSIVE GRASPING SURFACE ON AN ACTIVE GRASPING ROBOTIC MANIPULATOR

(71) Applicant: Ocado Innovation Limited, Hatfield (GB)

(72) Inventors: David Gabriel Hallock, San Francisco, CA (US); Jun Jeong, San Francisco, CA (US); Thomas John Hummel, San Mateo, CA (US)

(73) Assignee: Ocado Innovation Limited, Hatfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,149

(22) Filed: Nov. 16, 2022

(65) Prior Publication Data

US 2023/0075952 A1   Mar. 9, 2023

Related U.S. Application Data

(63) Continuation of application No. 16/691,404, filed on Nov. 21, 2019, now Pat. No. 11,559,884.

(Continued)

(51) Int. Cl.
*B25J 9/16* (2006.01)
*B25J 15/06* (2006.01)

(52) U.S. Cl.
CPC ........... *B25J 9/1612* (2013.01); *B25J 9/1679* (2013.01); *B25J 15/0683* (2013.01)

(58) Field of Classification Search
CPC .... B25J 9/1612; B25J 9/1679; B25J 15/0683; B25J 15/0023; B25J 15/08
See application file for complete search history.

(56) References Cited

U.S. PATENT DOCUMENTS 9,579,219 B2 *   2/2017   Amend, Jr. ............. A61F 2/586
2016/0136820 A1   5/2016   Lessing et al.
(Continued)

FOREIGN PATENT DOCUMENTS

CA        20180264660 A1 *   9/2018   ............. B25J 9/046
WO     WO-2015006613 A1 *   1/2015   .......... B25J 15/0023
(Continued)

OTHER PUBLICATIONS

Masahiro et al., "Variable Inner Volume Mechanism for Soft and Robust Gripping: Improvement of Gripping Performance for Large-Object Gripping" 2016 IEEE International Symposium on Safety, Security, and Rescue Robotics (SSRR), EPFL, Lausanne, Switzerland, Oct. 23-27, 2016 (Year: 2016).*

(Continued)

*Primary Examiner* — Adam R Mott
*Assistant Examiner* — Elizabeth Rose Neleski
(74) *Attorney, Agent, or Firm* — Seed Intellectual Property Law Group LLP

(57) ABSTRACT

One or more embodiments of the present disclosure relate generally to the field of robotic grasping systems, and in particular to an active robotic manipulator that includes a passive grasping component so that the robotic manipulator can grasp a wide variety of objects and simultaneously provide soft grasping features which reduce the risk of damage to objects.

20 Claims, 8 Drawing Sheets

Related U.S. Application Data

(60) Provisional application No. 62/772,452, filed on Nov. 28, 2018.

(56) References Cited

U.S. PATENT DOCUMENTS

| | | | |
|---|---|---|---|
| 2018/0264660 A1* | 9/2018 | Bergeron | B25J 9/046 |
| 2019/0263001 A1 | 8/2019 | Koike et al. | |
| 2019/0308333 A1 | 10/2019 | Chen et al. | |
| 2020/0402418 A1* | 12/2020 | Sasagawa | A61B 5/42 |

FOREIGN PATENT DOCUMENTS

| | | | |
|---|---|---|---|
| WO | WO 2015006613 A1 | 1/2015 | |
| WO | WO-2015123128 A1 * | 8/2015 | B25J 15/0023 |
| WO | WO 2015123128 A1 | 8/2015 | |

OTHER PUBLICATIONS

Brown et al., "Universal robotic gripper based on the jamming of granular material", *PNAS*, vol. 107(44), Nov. 2, 2010, pp. 18809-18814.

U.S. Appl. No. 16/565,186 titled "System and Method for Robotic Gripping Utilizing Dynamic Collision Modeling for Vacuum Suction and Finger Control" filed Sep. 9, 2019.

* cited by examiner

SYSTEMS AND METHODS FOR A PASSIVE GRASPING SURFACE ON AN ACTIVE GRASPING ROBOTIC MANIPULATOR

BACKGROUND

Field of the Invention

The present invention relates generally to the field of robotic grasping systems, and in particular to a robotic manipulator with gripping fingers that include a passive grasping surface that conforms to objects using negative pressure.

Description of Related Art

Robotic manipulators can be robotic end effectors that can grasp, manipulate, transport, and otherwise perform a variety of operations on various types of objects. Conventional robotic manipulators have traditionally been categorized as active and passive.

Conventional active robotic manipulators typically use a series of mechanically-actuated fingers, and can also include suction mechanisms in order to grip objects. Such conventional manipulators pose several challenges. For example, the use of suction tends to require smooth, debris-free, dry and generally flat surfaces, which limits the types and conditions of objects that can be held by a suction grip.

Furthermore, mechanically-actuated fingers often convey significant undamped crushing forces against objects during grasping, which can lead to damaging the object as well as its packaging. These significant forces can also leave damaging and unsightly marks on the surface of the object or its packaging, which is not ideal in a retail supply chain setting where the object can arrive at a customer with damage marks. Mechanically-actuated fingers are also limited in their ability to grasp fragile or delicate objects. In addition, conventional active robotic manipulators can have a difficult time securely grasping objects with complex geometries.

Conventional passive robotic manipulators are typically under actuated, and include components that passively conform to objects having a variety of shapes, including complex geometries, and can provide a soft grasp which mitigates the risk of damage to the object. Passive robotic manipulators also have the ability to grip a wide range of objects without always requiring complex grasp planning or re-tooling of the end-effector. However, due to inherent limitations on hold force, passive robotic manipulators tend to not perform well when grasping large or heavy objects.

Therefore, in view of the foregoing disadvantages and problems known in the art, there exists a need for an active robotic manipulator that includes a passive grasping component so that the robotic manipulator can grasp a wide variety of objects and simultaneously providing soft grasping features which reduce the risk of damage to objects.

SUMMARY

In one embodiment, the disclosure relates to a system for a robotic manipulator having an active grasping component that allows for passive grasping of an object, comprising: a controller; at least two fingers configured to provide an active grasp of the object; a passive grasping surface coupled to each of the fingers, wherein each of the passive grasping surfaces includes a deformable shell having an interior containing a medium; an actuator communicatively coupled to the controller, the actuator configured to control movement of the fingers; and a pump communicatively coupled to the controller, the pump configured to deliver fluid pressure to the interior of the shell, the pump further configured to suction fluid from the interior of the shell.

In another embodiment, the disclosure relates to a method for grasping an object with a robotic manipulator having fingers that include a passive grasping component: positioning, by a controller, at least two active grasping fingers to be adjacent to the object; instructing, by the controller, a pump to apply negative pressure to an interior of a shell coupled to each of the active grasping fingers, wherein the shell is configured to conform to a shape of the object upon application of the negative pressure; determining, by the controller, if the active grasping fingers are securely grasping the object after the application of negative pressure to the interior of the shell; instructing, by the controller, the pump to re-apply negative pressure to the interior of the shell if the active grasping fingers are not securely grasping the object; determining, by the controller, if the active grasping fingers are over-grasping the object after the application of the negative pressure to the interior of the shell; and instructing, by the controller, the pump to apply positive pressure to the interior of the shell if the active grasping fingers are over-grasping the object.

In yet another embodiment, the disclosure relates to a system for a robotic manipulator having an active grasping component that allows for passive grasping of an object, comprising: a controller; at least two fingers configured to provide an active grasp of the object; a deformable shell coupled to each of the fingers, wherein each deformable shell has a hollow interior containing a medium, and wherein each deformable shell has an outer surface configured to contact the object; an actuator communicatively coupled to the controller, the actuator configured to control movement of the fingers; and a pump communicatively coupled to the controller, the pump configured to deliver fluid pressure to the interior of the shell, the pump further configured to suction fluid from the interior of the shell, wherein the controller is configured to simultaneously control the actuator and the pump.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

It should be understood that aspects of the invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the invention is described with respect to its application for pick-and-place applications, it is understood that the systems and methods could be implemented in any setting where a robotic manipulator may be useful, such as in various stages in a supply chain, assembly line, manufacturing environment, storage and warehouse facility, sorting stations, laboratory, and retail and commercial settings.

Figure 1:
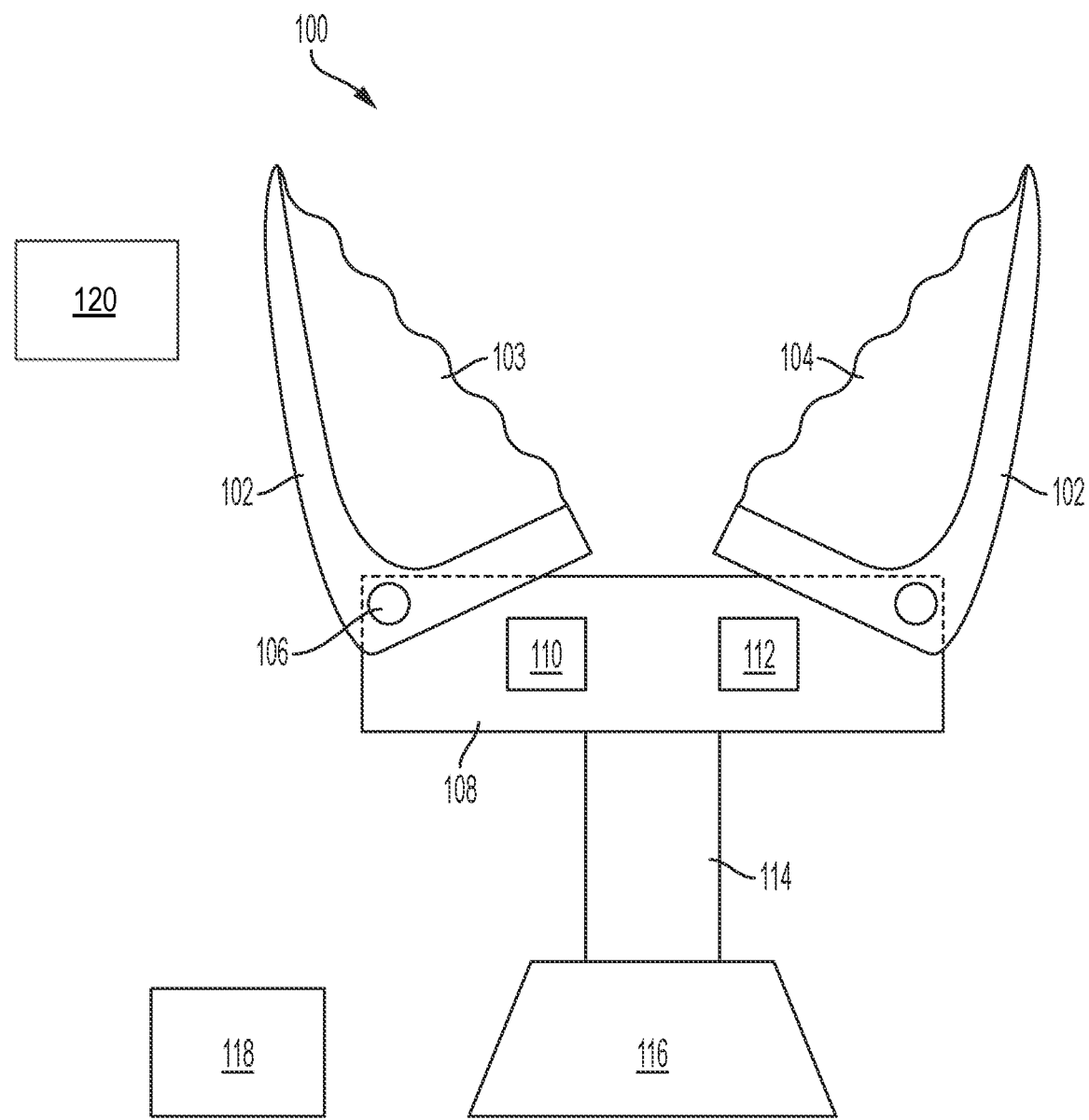
FIG. 1 is an elevational view of a robotic manipulator with fingers in an extended state, according to an embodiment of the invention.

FIG. 1 is a perspective view of a robotic manipulator 100 with fingers 102 in an extended state, according to an embodiment of the invention, In an embodiment, the robotic manipulator 100 can include more than two fingers, and can further include a suction grip (not shown), which is described in more detail in wholly owned U.S. non-provisional patent application Ser. No. 16/565,186 entitled "System and Method for Robotic Gripping Utilizing Dynamic Collision Modeling for Vacuum Suction and Finger Control", filed on Sep. 9, 2019, the contents of which are herein incorporated in its entirety by reference.

The robotic manipulator 100 further includes mechanical linkages 106 which couple each finger 102 to a pedestal 108. In an embodiment, the mechanical linkages 106 allow each finger 102 to pivot about an axis relative to a horizontal plane of the pedestal 108. In an embodiment, the mechanical linkages 106 are independent pivot pins which allow independent movement of each finger 102. In an embodiment, the mechanical linkages 106 can be in the form of a rod, axle, screw, coil, bar, and the like.

In another embodiment, the mechanical linkages 106 can be coupled to one another, thereby allowing for synchronous movement of both fingers 102.

In another embodiment, the fingers 102 can be mounted to the pedestal 108 via mechanical linkages 106 that allow for rotation of each finger 102 about an axis relative to a vertical plane of the pedestal 108. Such an arrangement allows each finger 102 to move closer to, or farther apart, from one another about a circular arc formed around the vertical plane of the pedestal 108.

In an embodiment, the pedestal 108 includes an actuator 110 that is used to control movement of the fingers 102. In an embodiment, the actuator 110 can be a motorized actuator, electric/battery-operated actuator, mechanical actuator, or hydraulic actuator. In yet another embodiment, the robotic manipulator 100 can include multiple actuators, such as a primary actuator, and a backup actuator which is configured to operate in the event a primary actuator fails. The primary and backup actuators can both be of the same type (i.e., pneumatic), or alternatively, the primary and backup actuators can be of different types (i.e., one is pneumatic and the other is electrical/battery-operated).

In an embodiment, the actuator 110 can be coupled to supply lines to deliver fluid pressure, which can be an air or pneumatic-based pressure, or a liquid or hydraulic-based pressure, to the fingers 102 and/or mechanical linkages 106.

In an embodiment, the pedestal 108 further includes a pump 112 that is used to control pressure delivery and suction to the left and right passive grasping surfaces 103, 104. In a preferred embodiment, the pump 112 provides an air or pneumatic-based pressure via compressed air, gas, compressed gas, oxygen, carbon dioxide, and the like.

In another embodiment, the pump 112 provides a liquid or hydraulic-based medium delivery, where the medium is in a liquid form, such as pressurized water, oil, viscoelastic fluid, or any other suitable liquid.

In an embodiment, the pump 112 can include a compressor and vacuum pump, and can perform suction operation where negative pressure is introduced into respective hollow interiors formed by the passive grasping surfaces 103, 104.

In an embodiment, the actuator 110 and pump 112 can be combined into a single actuator (not shown) that provides for movement of the fingers 102 as well as control of pressure delivery and suction for the left and right passive grasping surfaces 103, 104.

In an embodiment, the actuator 110 and/or pump 112 are integrated with, or physically coupled to the pedestal 108 or fingers 102. In an embodiment, the actuator 110 and/or pump 112 can be removably coupled to the pedestal 108 or finger 102. In another embodiment, the actuator 110 and/or pump 112 can be located remotely from the pedestal 108, wherein supply lines (not shown) can be routed to the fingers 102 and/or mechanical linkages 106 via the mount 114.

In an embodiment, the pedestal 108 can be mounted to a robotic arm assembly 116 via a mount 114. For example, the robotic arm assembly 116 can be a cantilevered arm, an assembly mounted on a track, wheels, or guide system, or can be floor or structure mounted assembly. The robotic arm assembly 116 can have a multi-axis or full range of motion.

In an embodiment, a controller 118 is communicatively coupled to the robotic manipulator 100. The controller 118 can be hard-wired to the robotic manipulator 100, or can be coupled to the robotic manipulator 100 through wireless means, such as via a short-range communication protocol, such as Bluetooth®, infrared, ZigBee®, and/or optical wireless protocols. In an embodiment, the wireless means can include a long-range communication protocol, such as wifi, cellular, satellite, broadband, and the like. The controller 118 can be located in the vicinity of the robotic manipulator 100, can be physically integrated (permanently or removably) with the robotic manipulator 100, or can be located remotely from the robotic manipulator 100.

In an embodiment, a sensor 120 is communicatively coupled to the robotic manipulator 100 and/or to the controller 118. The sensor 120 can include multiple sensors, and further can include cameras, imaging devices, pressure transducers, multi-axis force torque sensors, strain gauges, single axis load cells, tactile sensors, finger extension sensors, linear and rotary encoders, optical sensors, thermal sensors, weight sensors, accelerometers, gyroscopes, altimeters, and the like. The sensor 120 can be wirelessly coupled to the robotic manipulator 100 and/or to the controller 118, or the sensor 120 can be physically integrated with the robotic manipulator 100. In another embodiment, the sensor 120 can be hard-wired to the robotic manipulator and/or to the controller 118. In an exemplary embodiment, one sensor such as a camera can be mounted adjacent to the robotic manipulator 118, and can be coupled to the controller 118, while another sensor such as a pressure transducer can be physically integrated the fingers 102 of the robotic manipulator 100.

Figure 2A:
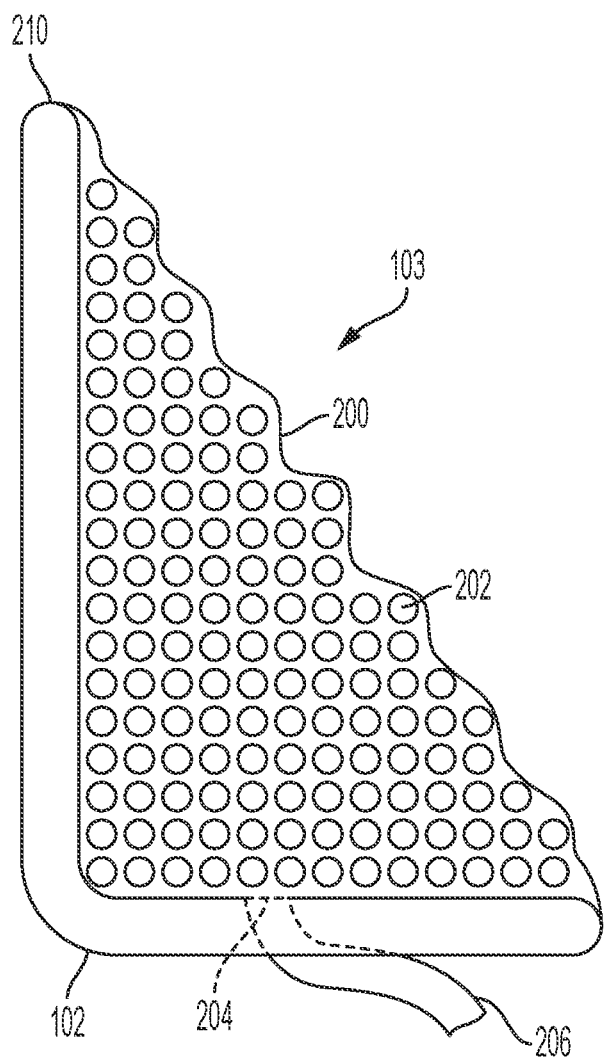
FIG. 2A is an elevational view of a passive grasping surface in a compliant state, according to an embodiment of the invention.
Figure 2B:
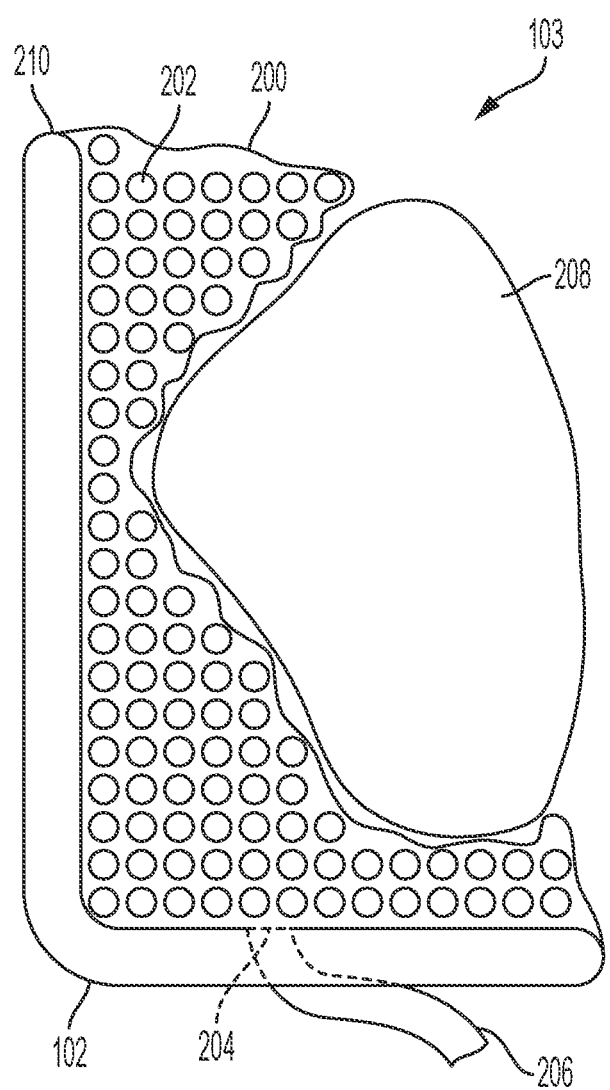
FIG. 2B is an elevational view of a passive grasping surface in a stiffened state, according to an embodiment of the invention.

FIG. 2A is a perspective view of a passive grasping surface of each passive grasping surface 103, 104 in a compliant state, according to an embodiment of the invention. Each passive grasping surface 103, 104 is configured to contact an object to be gripped, manipulated, handled, or moved. The left and right passive grasping surfaces 103, 104 each include a shell 200 that is filled with a medium 202 that allows for compression of each passive grasping surface 103, 104 when in contact with an object 208 (FIG. 2B). In an embodiment, the shell 200 is hollow, or substantially-hollow, and can receive the medium 202. In an embodiment, the shell 200 is compliant, deformable, malleable, soft, or otherwise has properties that allow the shell 200 to be flex, bend, and conform when in contact with an object 208. In an embodiment, the shell 200 can be made from silicone, an elastomer or elastomeric materials (such as, for example, synthetic rubbers, EPDM rubber or neoprene rubber, Latex, and the like), polymeric materials, vinyl, rubber, a metal foil, films, non-porous woven fabric, and the like.

In yet another embodiment, only one finger includes a passive grasping surface.

In an embodiment, the medium 202 can include various types of porous particulate or granular materials, such as coffee grounds, sand, rice, metal fragments, rubber fragments, sawdust, flour, salt, smooth rocks, and pellets or beads formed from polymers, foam, elastomers, silicone, etc. In yet another embodiment, the medium 202 can include a liquid, such as water or alcohol, or an aqueous medium, such as gel. In yet another embodiment, the medium 202 can include open cell or closed cell foam. In another embodiment, the medium 202 can be air, or heavier-than-air gases such as, but not limited to, argon, carbon dioxide, chlorine, ozone, krypton, oxygen, and xenon.

In yet another embodiment, the medium 202 can include a combination of particulate or granular materials, liquid, and air or gas.

In an embodiment, the shell 200 includes a port 204 that is coupled to supply line 206 at a downstream end, and which is coupled to the pump 112 at an upstream end. The pump 112 can provide a suction or vacuum operation in order to introduce negative pressure to the interior volume of the shell 200, thereby compressing and compacting the medium 202, and stiffening the shell 200, as shown in FIG. 2B. As a result of the suction operation, the compressed medium 202 causes the shell 200 to deform into a stiffened, rigid or semi-rigid shape that is secured around the surface of the object 208, thereby providing an improved grasp for the fingers 102, and where each passive grasping surface 103, 104 retains its shape around the object 208. In an embodiment, the shell 200 envelopes at least one surface or side of the object 208 after the suction operation.

In yet another embodiment, instead of, or in conjunction with, the suction operation, the system can dynamically adjust the amount of medium 202 within the shell 200. For example, a storage container (not shown) can store the medium 202, and a delivery mechanism, such as the pump 112, can deliver additional medium to the interior of the shell 200 to increase stiffening of each passive grasping surface 103, 104. For example, in conjunction with a suction operation to introduce negative pressure into the interior of the shell 200, additional medium can be pumped into the interior of the shell 200 at the same time.

Conversely, the pump 112 can operate to remove medium 202 from the interior of the shell 200, in order to reduce the stiffness of the shell 200.

In an embodiment, the controller 118 can simultaneously control the actuator 110 and the pump 112, thereby allowing for precise positioning of the fingers 102 while at the same time adjusting the stiffness of the shell 200 to obtain an optimal grasp of the object 208.

In an embodiment, the shell 200 can be filled with the medium 202 at the time of manufacture, and sealed so that the medium 202 cannot be modified, removed, or altered. In another embodiment, the shell 200 can include a re-sealable opening (not shown), whereby the opening can be used to adjust the amount of medium 202 within the shell 200, or replace the medium 202 with another type of medium.

In an embodiment, the fingers 102 can each include a narrow distal end 210. The distal end 210 allows for the fingers 102 to perform a rigid "pinch" operation to grip, or grasp around, the object 208. The distal end 210 can have a variety of shapes, such as a point, flat, hook, and/or textured surface to facilitate grasping by the fingers 102, and the distal end 210 shown in FIGS. 2A and 2B are shown for illustrative purposes only, and not intended to limit the present invention.

In an embodiment, only one finger may include a narrow distal end 210.

In yet another embodiment, compression of the medium 202 can be controlled to achieve a desired shape of the shell 200. For example, based on a desired, calculated, or predicted grasping location or object dimension, the pump 112 can be controlled to optimally control stiffening at certain locations of the shell 200 in order to form a specific shape. Thus, the overall shape of the shell 200 can be dynamically varied and optimized based on the characteristics of the object 208, such as, for example, geometry, size, angles, dimensions, and weight.

In an embodiment, when the robotic manipulator 100 is ready to release the grasped object 208, the controller 118 can cause the pump 112 to introduce positive pressure into the shell 200 via the port 204, causing the shell 200 to become compliant and less rigid. Upon becoming compliant, the passive grasping surfaces 103, 104 loosen their grip on the object 208, causing the object 208 to be dislodged, fall, or otherwise be removed from the fingers 102. When the positive pressure is introduced via the port 204, the air pressure within the shell 200 is increased, thereby decompressing the medium 202, and returning the passive grasping surfaces 103, 104 to a compliant state.

In yet another embodiment, the shell 200 can include a vent (not shown). When the robotic manipulator 100 is ready to release the grasped object 208, the controller 118 can cause the vent to open, thereby releasing pressure within the shell 200, and causing the shell 200 to become compliant and less rigid. Upon becoming compliant, the passive grasping surfaces 103, 104 loosen their grip on the object 208, causing the object 208 to be dislodged, fall, or otherwise be removed from the fingers 102.

In an embodiment, when the shell 200 is stiffened, the air pressure within the shell 200 is reduced such that it is lower than the air pressure of the surrounding atmosphere outside of the shell 200. When the vent is opened, the air pressure within the shell 200 is increased or neutralized by the introduction of the higher pressure atmospheric air, thereby decompressing the medium 202, and returning the passive grasping surfaces 103, 104 to a compliant state.

Figure 3:
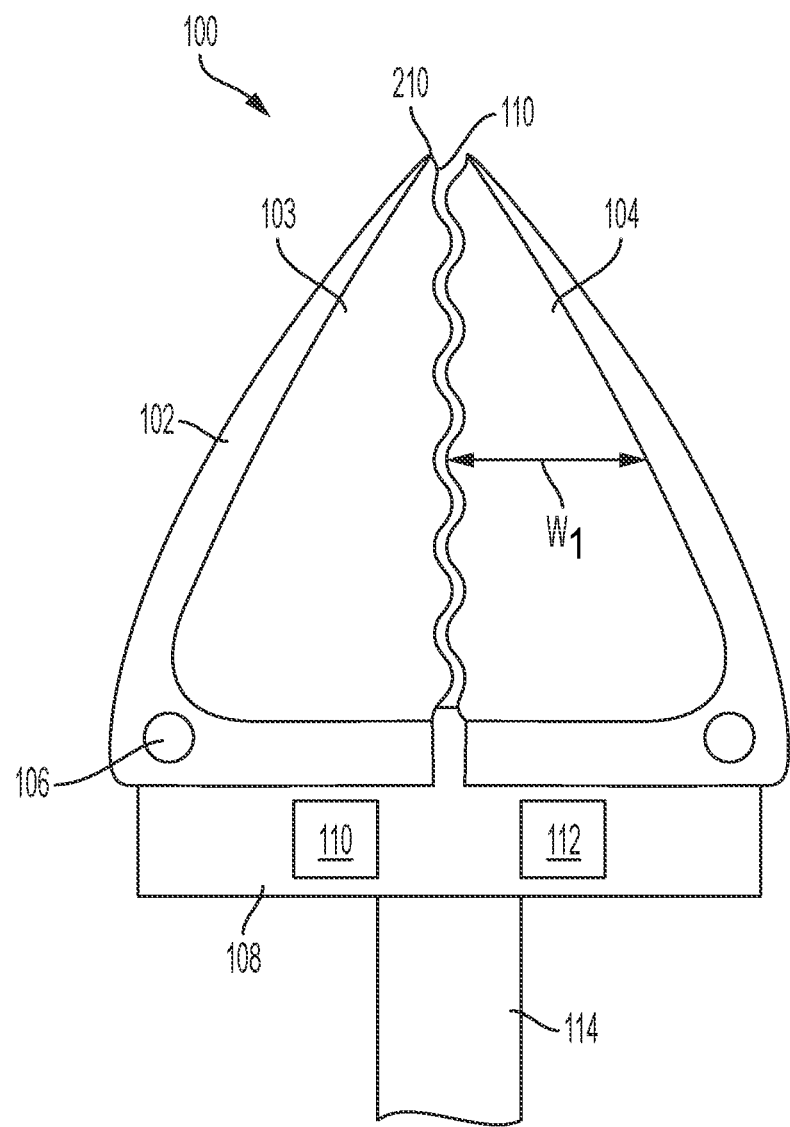
FIG. 3 is an elevational view of a robotic manipulator with fingers in a closed state, according to an embodiment of the invention.

FIG. 3 is a perspective view of a robotic manipulator 100 with fingers 102 in a closed state, according to an embodiment of the invention. In an embodiment, the fingers 102 can rotate about an axis relative to a horizontal plane of the pedestal 108 such that the respective passive grasping surfaces 103, 104 are in contact, or in near contact, with each other. Furthermore, when there is no object being grasped between the fingers 102, each passive grasping surface 103, 104 can have a first width $W_1$.

Figure 4A:
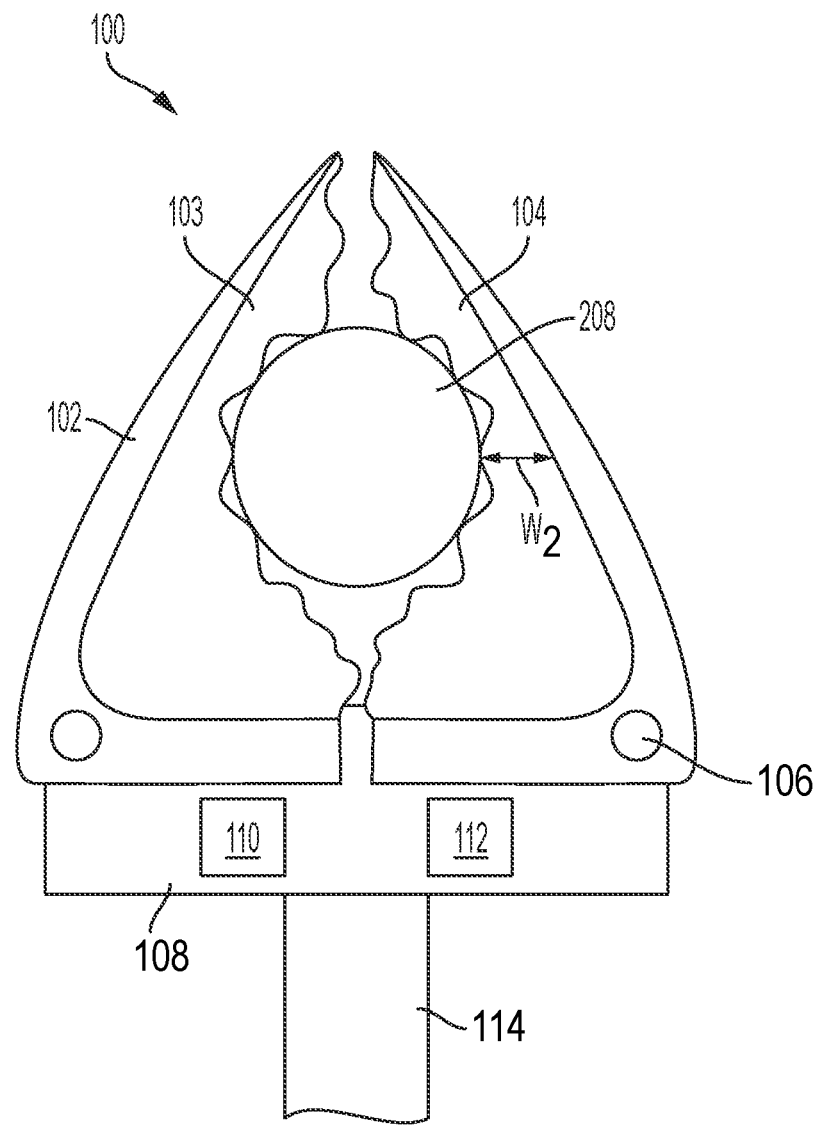
FIG. 4A is an elevational view of a robotic manipulator with an object having equal sides and angles grasped by the fingers, according to an embodiment of the invention.

FIG. 4A is a perspective view of a robotic manipulator 100 with an object 208 having equal sides and angles grasped by the fingers 102, according to an embodiment of the invention. When the fingers 102 are controlled to grasp the object 208, each passive grasping surface 103, 104 becomes stiffened due to a suction operation, as detailed above. As shown in FIG. 4A, each passive grasping surface 103, 104 conforms to the shape of the object 208, and the width of the passive grasping surfaces is reduced to a second width $W_2$.

Figure 4B:
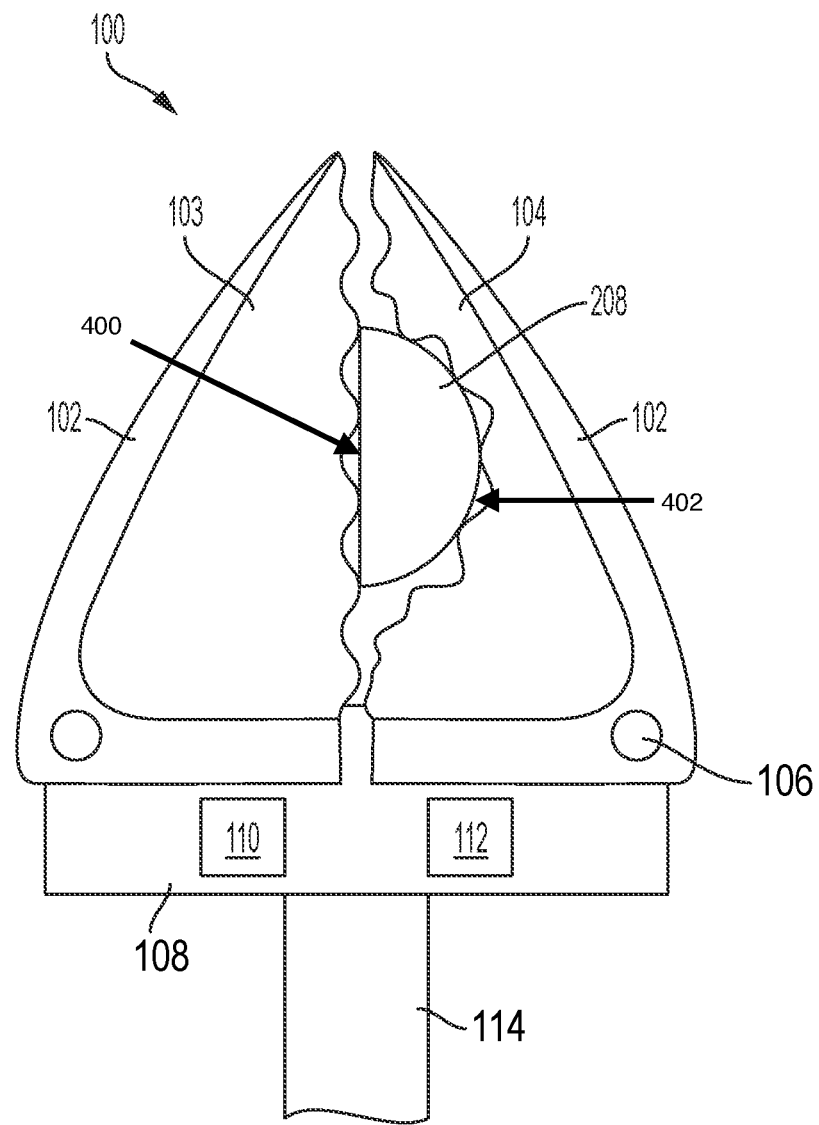
FIG. 4B is an elevational view of a robotic manipulator with an object having unequal sides and angles grasped by the fingers, according to an embodiment of the invention.

FIG. 4B is a perspective view of a robotic manipulator 100 with an object 208 having unequal sides and angles grasped by the fingers 102, according to an embodiment of the invention. When the fingers 102 are controlled to grasp the object 208, each passive grasping surface 103, 104 becomes stiffened due to a suction operation, as detailed above. As shown in FIG. 4B, each respective passive grasping surface 103, 104 is stiffened to a different shape to conform to the specific shape of the side of the object 208. In this embodiment, the left passive grasping surface 103 has a grasping width of $W_1$, due to the flat side 400 of the object 208, while the right passive grasping surface 504 has a grasping width of $W_2$, due to compression from the bulging side 402 of the object 208.

In an embodiment, each passive grasping surface 103, 104 can have a separate pump that provides independent pressure delivery and suction. In another embodiment, both of the passive grasping surfaces 103, 104 can be coupled to a single pump, such as pump 112, which provides pressure delivery and suction to each passive grasping surface 103, 104.

Figure 5:
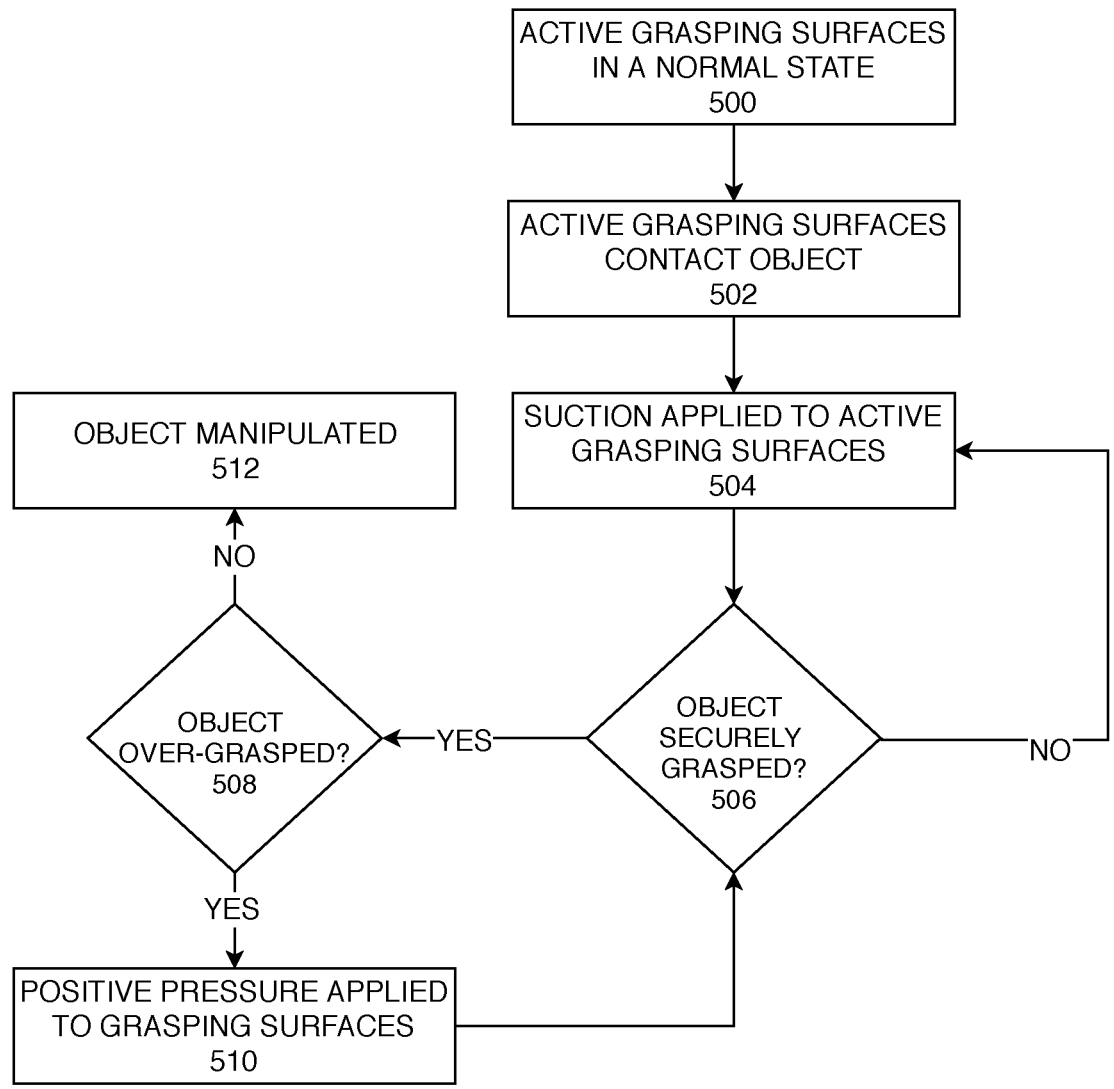
FIG. 5 is a flowchart depicting the steps of grasping an object with fingers having passive grasping surfaces, according to an embodiment of the invention.

FIG. 5 is a flowchart depicting the steps of grasping an object 208 with fingers 102 having passive grasping surfaces 103, 104, according to an embodiment of the invention. At step 500, each passive grasping surface 103, 104 is in a compliant state. The compliant state is a condition where no suction or negative pressure has been applied to the shell 200, or a state where the shell 200 is not stiffened, and is capable of being conformed upon contact with an object 208.

At step 502, the fingers 102 are maneuvered to be located around or adjacent to the object 208, and each passive grasping surface 103, 104 is placed in contact, or in near contact, with the sides of the object 208. At step 504, suction is applied to the interior of the shell 200, thereby compressing and compacting the medium 202, and stiffening the shell 200.

At step 506, the controller 118 determines if the object 208 is securely grasped by each passive grasping surface 103, 104. The controller 118 can receive image data, such as a video feed, from a sensor 120, such as a camera or cameras, located in the vicinity of the robotic manipulator 100 that provide a real-time, or near real-time, view of the fingers 102 and each passive grasping surface 103, 104. In an embodiment, the camera(s) can be mounted on the robotic manipulator 100 and/or the fingers 102. In an embodiment, the camera(s) can be video cameras, thermal imaging cameras, infrared camera, line scan cameras, area scanners, linear array cameras, stereoscopic cameras, and the like.

In an embodiment, each passive grasping surface 103, 104 can include a force/torque sensor, a tactile sensor, a specialized slip sensor, or a combination thereof, that can be used to detect situations in which an object 208 is slipping out of the grasp of the fingers 102.

In another embodiment, a human teleoperator can manually view the image data to determine if the object 208 is slipping out of grasp of the fingers 102.

In another embodiment, each passive grasping surface 103, 104 can include a microsensor such as a hot-wire anemometer, to detect slippage of the object 208 from between the passive grasping surfaces 103, 104, by detecting the changes in velocity of the surface of the shell 200. The microsensor can include a probe kept at constant temperature by an integrated processor. The microsensor can trigger a slip signal to the controller 118 when an increase in the convective heat transfer associated with the occurrence of slipping of the object 208 across the shell 200 of one or both passive grasping surfaces 103, 104 is detected.

In yet another embodiment, each passive grasping surface 103, 104 can include a film containing a spot- or pattern-array. Each spot or pattern can be used to detect vibrations associated with slippage of the object 208 across each shell 200 of one or both passive grasping surfaces 103, 104. In addition, an accelerometer can be used to detect the velocity of slipping, such that slip velocity above a pre-determined threshold triggers a slip signal to the controller 118.

If the controller 118 determines that the object 208 is not securely grasped, then the controller 118 returns to step 504 and re-applies suction to one or both shells 200 to increase stiffening of one or both passive grasping surfaces 103, 104. In an embodiment, the controller 118 can also adjust the placement of the fingers 102 around the object 208. For example, the controller 118 can determine if the object 208 has sides or portions that are optimal for grasping (e.g., flat surfaces, surfaces with indentations that can be hooked, surfaces with a high coefficient of friction, and the like), and can adjust the placement of the fingers 102 on these optimal sides or portions of the object 208. The controller 118 then continues to step 506 to determine if the object 208 is securely grasped.

In an embodiment, the controller 118 can monitor in real-time, or near real-time, whether the object 208 is securely grasped while the suction is being delivered by the pump 112.

In an embodiment, the controller 118 can independently control the pressure in each shell 200 of each passive grasping surface 103, 104. For example, if the left passive grasping surface 103 has securely grasped the object 208, but the right passive grasping surface 104 has not securely grasped the object 208, then the controller 118 can control the pump 112 to apply a suction operation to only the right shell to stiffen the right passive grasping surface 104. In another embodiment, the controller 118 can control the pump 112 to apply a different amount of suction to each shell 200.

If the controller 118 determines that the object 208 is securely grasped, then the controller 118 continues to step 508 to determine if the object 208 is over-grasped. In an embodiment, the controller 118 can receive image data, such as a video feed, from a camera or cameras located in the vicinity of the robotic manipulator 100 which provide a real-time, or near real-time, view of the fingers 102 and/or each passive grasping surface 103, 104. In an embodiment, the camera(s) can be mounted on the robotic manipulator 100 and/or the fingers 102.

The controller 118 can utilize image processing techniques on the image data, such as, for example, edge detection, line recognition, image graying, noise reduction, threshold segmentation, and the like, to detect if the object 208 is being crushed, bent, stretched, contorted, or otherwise compressed beyond an acceptable pre-determined threshold, which would indicate potential damage to the object 208. In an embodiment, the controller 118 can utilize the aforementioned image processing techniques to detect cracks, stress fractures, fatigue cracks, and other indications of breakage of the object 208 or its packaging.

In another embodiment, a human teleoperator can manually view the image data to determine if the object 208 is being over-grasped.

If the controller 118 determines that the object 208 is being over-grasped, then the controller continues to step 510 where positive pressure is re-applied to at least one passive grasping surface 103, 104. In an embodiment, the positive pressure is provided by the pump 112, and can be in the form of a fluid, such as a liquid, air, compressed air, gas, compressed gas, oxygen, carbon dioxide, and the like. In an embodiment, the controller 118 can monitor in real-time, or near real-time, whether the object 208 is being over-grasped while the positive pressure is being delivered by the pump 112.

In an embodiment, the controller 118 can control the pressure to only one passive grasping surface, or can individually control the pressure within each passive grasping surface. For example, if the left passive grasping surface 103 is not over-grasping the object 208, but the right passive grasping surface 104 is over-grasping the object 208, then the controller 118 can apply a suction operation to only the shell 200 of the right passive grasping surface 104. In another embodiment, the controller 118 can apply a different amount of suction to each shell 200. The controller 118 then continues to step 506 to determine if the object 208 is securely grasped.

If, however, the controller 118 determines that the object 208 is not being over-grasped, then the controller 118 continues to step 512, where the robotic manipulator 100 is controlled to manipulate, handle, move, or otherwise perform a desired operation on the object 208.

Figure 6:
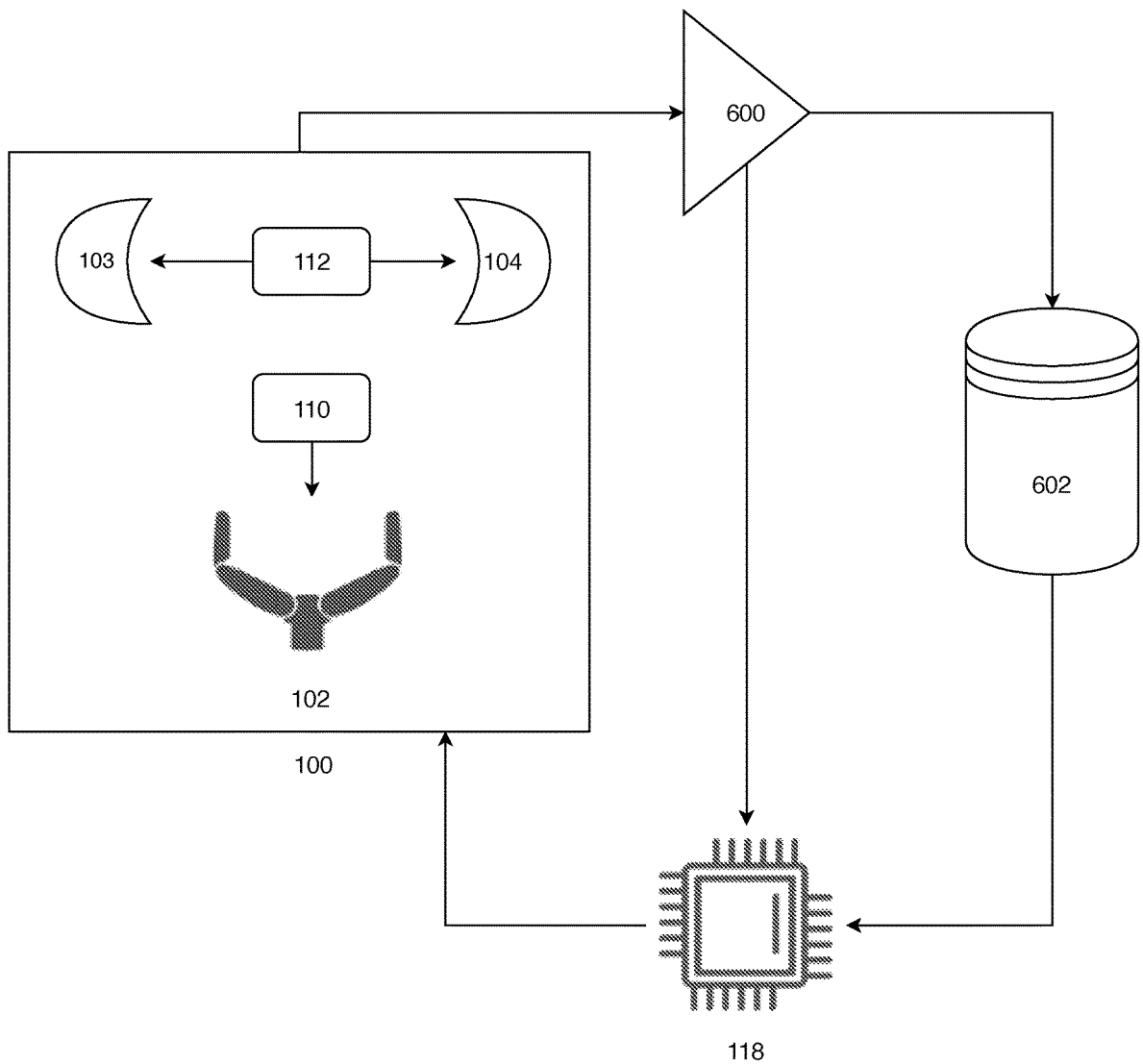
FIG. 6 is a system architecture diagram of a robotic manipulator that utilizes a feedback loop and a machine learning module, according to an embodiment of the invention.

FIG. 6 is a system architecture diagram of a robotic manipulator 100 that utilizes a feedback loop 600 and a machine learning module 602. In an embodiment, the controller 118 is configured to control the actuator 110 that controls movement of the fingers 102. The controller is further configured to the pump 112 which administers pressure delivery and suction to each passive grasping surface 103, 104. In an embodiment, sensor data from the fingers 102 and passive grasping surfaces 103, 104 is transmitted via a feedback loop 600 to the controller 118. In addition, the feedback loop 600 further transmits sensor data to a machine learning module 602.

In an embodiment, the machine learning module 602 is integrated with, or is machine-readable code that is executable on, the controller 118.

In an embodiment, each finger 102 can include sensors, such as force sensors, pressure transducers, multi-axis force torque sensors, strain gauges, single axis load cells, tactile sensors, and the like. The sensors can also include finger extension sensors, linear and rotary encoders, optical sensors, cameras, thermal sensors, weight sensors, accelerometers, gyroscopes, altimeters, and the like. The sensors can capture data related to the various movements, extensions, opening, closing, applied force, return force, object slippage, and the like related to the fingers 102.

In an embodiment, each passive grasping surface 103, 104 can include sensors, such as force sensors, pressure transducers, multi-axis force torque sensors, strain gauges, single axis load cells, tactile sensors, and the like. The sensors can also include compression and extension sensors for the shell 200, optical sensors, cameras, thermal sensors, weight sensors, accelerometers, gyroscopes, altimeters, and the like. The sensors can capture data related to the various movements, shapes, stiffening, rigidity, applied force, return force, object slippage, and the like related to the shell 200 and/or the medium 202.

The sensor data from the feedback loop 600 can be utilized by the controller 118 in real-time, or near real-time, to adjust or control the robotic manipulator 100, the fingers 102, and the passive grasping surfaces 103, 104.

In an embodiment, the machine learning module 602 utilizes a machine learning model that utilizes, for example, reinforcement learning, recursive learning, fuzzy logic, neural network processing, and the like, to analyze and process sensor data over time. The machine learning module 602 can generate learned data that is used by the controller 118 to control the robotic manipulator 100, the fingers 102, and the passive grasping surfaces 103, 104.

The sensor data can include data related to object shapes, dimensions, contours, densities, and weight, as well as feedback related to shell pressure, resistive pressure from objects, object drop rates, object grasp rates, finger slippage rates and velocities, object compression and crushing, and the like.

The learned data can be fed to the controller 118 from the machine learning module 602 to improve the speed, efficiency, and accuracy of the controller 118 when performing a grasping operation. The learned data can be based on real-time, or historical, sensor data. In the situation where historical sensor data is utilized, the machine learning module 602 can be adjusted to utilize sensor data from a user-defined historical time period.

In an embodiment, the machine learning module 602 can process the learned data to determine, for a particular object type, the optimal side(s) for grasping of the object, an optimal positioning of the fingers 102 around the object for grasping, an optimal suction amount or negative pressure for each passive grasping surface 103, 104, and the like.

In an embodiment, the machine learning module 602 can process the learned data to determine can a threshold for a slip velocity for a particular object type, as well as a threshold for compression or crushing of a particular object type. For example, if a particular object is lightweight or has a thin or delicate structure, the learned data can indicate a low threshold for compression or crushing.

In yet another embodiment, the machine learning module 602 can process the learned data can to determine whether a particular type of medium (e.g., pellets, beads, sand, liquid, etc.) is optimal for a particular object type. For example, the learned data may indicate that objects with curved surfaces may exhibit less slippage and stronger grasp holding when the medium 202 is extremely granular, such as in the case of sand or salt. Conversely, the learned data may indicate that objects with corners may exhibit less slippage and stronger grasp holding when the medium 202 has less granularity, such as is silicone pellets or rocks.

The learned data can be transmitted to the controller 118, where the controller 118 can generate a command signal for the pump and/or the actuator based on the learned data.

The robotic manipulator 100 can be utilized within a storage space or an assembly line. The storage space, as used herein, can be a bin, box, sorting station, room, or volume that is used to store, hold, warehouse, or otherwise contain objects.

While the principles of the disclosure have been illustrated in relation to the exemplary embodiments shown herein, the principles of the disclosure are not limited thereto and include any modification, variation or permutation thereof. The contents of Provisional Application No. 62/772,452 filed Nov. 28, 2018 and U.S. application Ser. No. 16/691,404 filed Nov. 21, 2019 are hereby incorporated herein by reference in its entirety.

What is claimed is:

1. A system for a robotic manipulator having an active grasping component that allows for passive grasping of an object, comprising:
   a controller;
   at least two fingers configured to provide an active grasp of the object;
   at least two passive grasping surfaces, each one of the at least two passive grasping surfaces coupled to a respective one of the at least two fingers, wherein each of the passive grasping surfaces includes a deformable shell having an interior containing a medium;
   a storage container configured to store the medium; and
   a pump communicatively coupled to the controller, the pump configured to deliver the medium from the storage container to the interior of at least one shell of the passive grasping surfaces, the pump further configured to suction the medium from the interior of the at least one shell.

2. The system of claim 1, wherein the pump is further configured to deliver fluid pressure to the interior of the at least one shell and to suction fluid from the interior of the at least one shell.

3. The system of claim 2, wherein the fluid is selected from a group consisting of a liquid and a gas.

4. The system of claim 2, wherein the medium is configured to compress when the pump suctions fluid from the interior of the at least one shell.

5. The system of claim 2, wherein the at least one shell is configured to conform to a shape of the object when the pump suctions fluid from the interior of the shell.

6. The system of claim 1, wherein the medium is selected from a group consisting of coffee grounds, sand, rice, metal fragments, rubber fragments, sawdust, flour, salt, and rocks.

7. The system of claim 1, wherein the medium is selected from a group consisting of polymers, foam, elastomers, and silicone.

8. The system of claim 1, further comprising an actuator communicatively coupled to the controller, wherein the controller is configured to control the actuator and the pump based on learned data generated from a machine learning model that has processed sensor data from the robotic manipulator.

9. The system of claim 1, further comprising an actuator communicatively coupled to the controller for controlling movement of the fingers, wherein the controller is configured to independently control each of the fingers.

10. A system for a robotic manipulator having an active grasping component that allows for passive grasping of an object, comprising:
    at least two fingers configured to provide an active grasp of the object;
    at least two passive grasping surfaces, each one of the at least two passive grasping surfaces coupled to a respective one of the at least two fingers, wherein each of the passive grasping surfaces includes a deformable shell having an interior containing a medium;
    a storage container configured to store the medium;
    a pump communicatively coupled to a controller, the pump configured to deliver the medium from the storage container to the interior of at least one shell of the passive grasping surfaces, the pump further configured to suction the medium from the interior of the at least one shell; and
    the controller, the controller configured to:
    determine whether the at least two fingers are over-grasping an object; and
    responsive to the determining that at least two fingers are over-grasping the object, instruct the pump to apply positive pressure to the interior of the deformable shell of at least one of the passive grasping surfaces.

11. The system of claim 10, wherein the pump is further configured to deliver fluid pressure to the interior of the at least one shell and to suction fluid from the interior of the at least one shell.

12. The system of claim 11, wherein the medium is configured to compress when the pump suctions fluid from the interior of the at least one shell.

13. The system of claim 11, wherein the at least one shell is configured to conform to a shape of the object when the pump suctions fluid from the interior of the shell.

14. The system of claim 10, further comprising an actuator communicatively coupled to the controller, wherein the controller is configured to control the actuator and the pump based on learned data generated from a machine learning model that has processed sensor data from the robotic manipulator.

15. The system of claim 10, further comprising an actuator communicatively coupled to the controller for controlling movement of the fingers, wherein the controller is configured to independently control each of the fingers.

16. One or more instances of non-transitory computer-readable media storing instructions or data, wherein the instructions or data cause one or more processors to perform a method comprising:
    determining whether at least two fingers of a robotic manipulator are over-graphing an object, wherein each of the at least two fingers are coupled to at least one passive grasping surface comprising a deformable shell having an interior containing a medium; and
    responsive to a determination that the at least two fingers are over-grasping the object, causing a pump to change a pressure of the interior of the deformable shell of at least one of the passive grasping surfaces by:
    delivering a medium from a storage container to at least one of the passive grasping surfaces; or
    suctioning the medium from at least one of the passive grasping surfaces.

17. The one or more instances of non-transitory computer readable media of claim 16, wherein the pump is further configured to deliver fluid pressure to the interior of the deformable shell of at least one of the passive grasping surfaces and to suction fluid from the interior of the deformable shell.

18. The one or more instances of non-transitory computer readable media of claim 17, wherein the medium is configured to compress when the pump suctions fluid from the interior of the deformable shell.

19. The one or more instances of non-transitory computer readable media of claim 17, wherein the at least one shell is configured to conform to a shape of the object when the pump suctions fluid from the interior of the deformable shell.

20. The one or more instances of non-transitory computer readable media of claim 16, wherein the method further comprises:
  causing the pump to change the pressure of the interior of the deformable shell based on learned data generated from a machine learning model that has processed sensor data from the robotic manipulator.

\* \* \* \* \*